(No Model.)
H. I. KOEGEL.
PAPER CUTTING MACHINE.
No. 559,179. Patented Apr. 28, 1896.
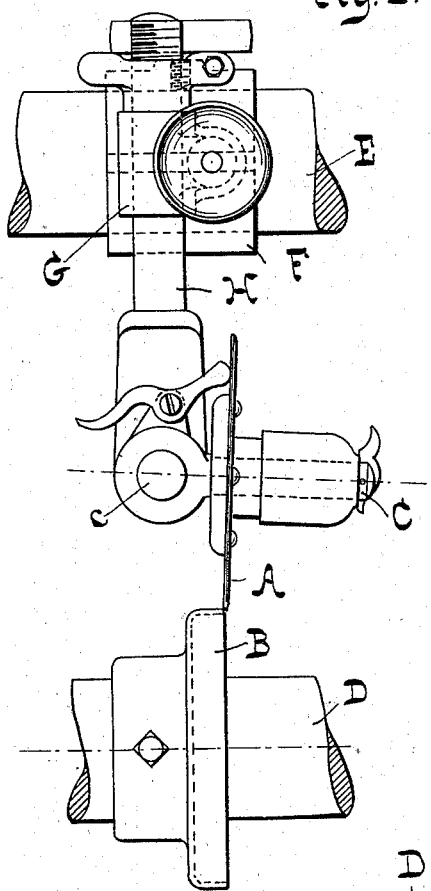
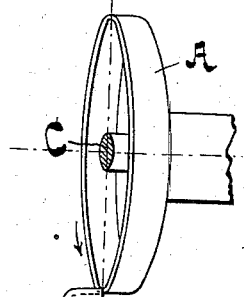
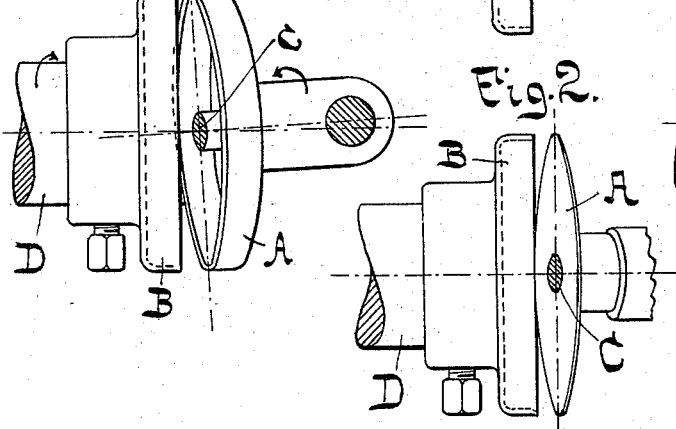
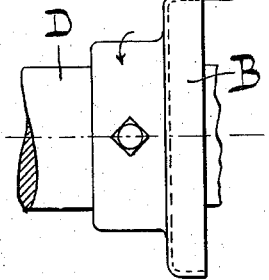
WITNESSES:
Chas. W. Thomas
L. K. Conrady
INVENTOR:
Herman I. Koegel,
BY
ATTORNEY

UNITED STATES PATENT OFFICE.

HERMAN I. KOEGEL, OF HOLYOKE, MASSACHUSETTS.

PAPER-CUTTING MACHINE.

SPECIFICATION forming part of Letters Patent No. 559,179, dated April 28, 1896.

Application filed September 21, 1894. Serial No. 523,672. (No model.)

*To all whom it may concern:*

Be it known that I, HERMAN I. KOEGEL, a citizen of the United States of America, and a resident of Holyoke, in the county of Hampden and State of Massachusetts, have invented certain new and useful Improvements in Paper-Cutting Machines, of which the following is a specification.

In all rotary paper-cutting machines heretofore known the adjacent cutting edges of each pair of cutters were rotated either in one and the same plane, or, as in the case of machines where one cutter of each pair was separately mounted, the cutting edges were arranged in intersecting planes, but the shafts or axes of rotation were located in parallel horizontal planes—that is to say, the shafts were not located in intersecting planes.

By the first-described arrangement—*i. e.*, with cutters located in one and the same plane—a very poor cut was produced, owing to the large surface of contact between the cutters and the consequent friction, by which, furthermore, the cutters were not only rapidly worn down, but soon became dull. Owing to these circumstances a rough cut and considerable dust were produced.

Mounting the cutters separately, so that it became possible to place the surfaces of the cutters into intersecting planes, according to the second arrangement above mentioned, was a decided improvement over the first method, since a shearing action was produced, which, although at right angles to the material, produced a cut much cleaner and more free from dust than could be obtained with the former arrangement. This advantage is due to the reduction of contact-surface between the cutters, in consequence of which a diminution in wear was also noticeable; but this cut was not as clean and free from dust as desired and the wear on the cutters was still too great.

The object of my invention is to overcome these defects in the present constructions by so arranging the cutters with relation to each other that a faultless cut, perfectly free from dust, is obtained.

The nature of my said invention will best be understood when described in connection with the annexed drawings, in which—

Figure 1 represents a front elevation of a pair of cutters, with their mountings, embodying my invention. Fig. 2 is a sectional plan of the two cutters, the hanger being omitted. Fig. 3 is an elevation illustrating a modified manner of placing the cutters with relation to each other. Fig. 4 is a plan view of Fig. 3.

Similar letters of reference designate corresponding parts.

Referring at present to Figs. 1 and 2, the letters A B designate the respective cutters forming one pair of a series, as usual in paper-cutting machines. The cutter A is mounted upon a shaft C, set at an angle to the rotary shaft D of the cutter B, but with this important distinction from the former manner of setting the cutters with respect to each other, that the center lines or axes of the shafts are in one and the same vertical plane. In view of this peculiar relative position of the cutters a cut inclined or at an angle to the material is obtained.

If, while the two cutters are at an inclination to each other, the cutter A is turned slightly in a direction at right angles to the direction of inclination, as in Figs. 3 and 4, so that the axes of the shafts C D no longer lie in the same plane, but in intersecting planes, a cut is obtained which is at an inclination to the surface of the paper and a shear-like action is produced. This cut is very clean and entirely free from dust and the cutting edges or faces of the cutters wear in the least degree.

In Fig. 1 I have illustrated one form of apparatus for carrying out my invention. Referring to this figure, the letter E designates a stationary shaft or bar, upon which is mounted a hanger F, provided with a hub G, in which the cutter-head H for the separately-suspended cutters A is mounted. The lower end of the cutter-head is bent forward and carries the shaft C, upon which the cutter A is loosely mounted. The shaft C is preferably swiveled, as at $c$, to enable the angle of inclination of the said cutter to be adjusted at will. The second set of cutters is mounted upon a rotary shaft D, extending parallel with the shaft or bar E, but forming an angle with the shaft C. A usual lever pivoted to the cutter-head and adapted to bear against the cutter is provided for throwing the upper cutter out of engagement with the lower cutter. By turning the cutter-head H in the hub G the cutter A is brought to the positions shown in Figs. 3 and 4.

It is of course evident that other means may be employed for supporting and adjusting the cutters to the several relative positions described. Therefore I do not wish to restrict myself to the means shown.

It is also evident that the cutters can be set to rotate in substantially horizontal planes—that is to say, the cutters together could be turned through an angle of ninety degrees from the position shown in Fig. 1.

What I claim as new is—

1. In a rotary cutting-machine, the combination of a hanger, a cutter-head mounted to turn axially in said hanger, a shaft mounted in the cutter-head to swing radially, a cutter mounted on said shaft, and a driving-cutter, substantially as and for the purpose set forth.

2. In a rotary cutting-machine, circular cutters having their cutting-surfaces rotating in planes forming a small angle with each other and the axes of their shafts inclined toward each other and located in intersecting planes, substantially as described.

In testimony that I claim the foregoing as my invention I have signed my name, in presence of two witnesses, this 19th day of September, 1894.

HERMAN I. KOEGEL.

Witnesses:
R. G. KILDUFF,
W. H. GRAVES.